(12) United States Patent
Tsuda

(10) Patent No.: US 6,341,539 B1
(45) Date of Patent: Jan. 29, 2002

(54) PARKING BRAKE SYSTEM

(75) Inventor: Toshio Tsuda, Amagasaki (JP)

(73) Assignee: Kanaki Kokyukoki Mfg. Co., Ltd. (JP)

( * ) Notice: Subject to any disclaimer, the term of this patent is extended or adjusted under 35 U.S.C. 154(b) by 0 days.

(21) Appl. No.: 09/418,598

(22) Filed: Oct. 15, 1999

(30) Foreign Application Priority Data

Dec. 24, 1998 (JP) ............................................ 10-367727

(51) Int. Cl.$^7$ ................................................. B60T 7/02
(52) U.S. Cl. ......................... 74/529; 74/540; 116/58 A
(58) Field of Search ......................... 74/529, 540, 481; 116/58 A

(56) References Cited

U.S. PATENT DOCUMENTS

| 1,823,695 A | * | 9/1931 | Moorhouse | 74/540 |
| 2,292,719 A | * | 8/1942 | Snell | 116/58 A |
| 2,293,698 A | * | 8/1942 | Chaput | 116/58 A |
| 3,757,604 A | * | 9/1973 | Schroeder | 74/529 |
| 4,037,487 A | * | 7/1977 | Ahlschwede et al. | 74/529 |
| 5,127,496 A | * | 7/1992 | Johnston | 74/529 X |

FOREIGN PATENT DOCUMENTS

JP  59-26060  2/1984

* cited by examiner

Primary Examiner—Mary Ann Green
(74) Attorney, Agent, or Firm—Sterne, Kessler, Goldstein & Fox

(57) ABSTRACT

A parking brake system for a vehicle comprising a brake pedal vertically penetrating a floor of a vehicle, a first engaging member integrally provided on the brake pedal below the floor, a parking brake operating member disposed above the floor, a second engaging member for engaging with the catch pivoted on a chassis of the vehicle below the floor so as to be shifted between a locking position and an unlocking position in accordance with operation of the parking brake operating member, and an overcenter spring interposed between the second engaging member and the chassis so as to alternately bias the second engaging member toward the locking position and the unlocking position. The parking brake operating member is shifted so as to be retained at either a releasing position or a parking position. The second engaging member is retained at the locking position when the parking brake lever is located at the parking position, and if the brake pedal is lowered, engages with the first engaging member. Between the second engaging member and the parking brake operating member are provided a first rod and a second rod disposed co-axially with each other, and a second spring interposed between both the rods so as to bias them toward each other, wherein the first rod interlocks with the second engaging member, and the second rod interlocks with the parking brake operating member. A grip of the parking brake operating member is provided thereon with a first caution-marked surface for indicating that the parking brake is released, and a second caution-marked surface for indicating that the parking brake is applied.

13 Claims, 9 Drawing Sheets

PARKING BRAKE SYSTEM

BACKGROUND OF THE INVENTION

1. Field of the Invention

The present invention relates to a parking brake system for locking a brake pedal provided on a working vehicle like an agricultural or utility tractor, which has a protection system for preventing the locked brake pedal from being unintentionally unlocked.

2. Related Art

Japanese Utility Model Laid Open Gazette No. Sho 59-26060, for example, discloses a conventional parking brake system for locking pressed brake pedals. In this regard, a catch is provided on a stem of a brake pedal, and a rotatable retainer is disposed under a footboard (floor) of the vehicle so as to removably hold the catch. A parking brake operating rod interlocking with the retainer projects upwardly from the footboard. If the rod is pulled up while the brake pedal is pressed, the retainer holds the catch, thereby locking the pedal in its position. If the brake pedal is further pressed strongly then, the catch removes from the retainer, so that the pedal is unlocked.

In the conventional system, the parking brake operating rod comprises a first rod, which interlocks with the retainer, and a second rod, which serves as an operating member. A stretchable spring is interposed between the first and second rods. An outwardly biased stopper is provided on the vehicle body and the second rod is provided with a catch to be retained by the stopper. When the rods are operated to apply the parking brake, the stopper withdraws once according to the moving second rod and expands again by the biasing force so as retain the catch of the second rod. Accordingly, even if an operator alights from the vehicle while his or her foot is on the brake pedal, the brake pedal is prevented from being unintentionally unlocked because the second rod of the parking brake operating rod is retained.

However, the conventional parking brake operating rod must be pulled up to apply the parking brake against the force of the spring, thereby requiring a strong operating force. Furthermore, the operator must look into the brake pedal to determine whether the brake pedal is locked or unlocked at its position.

SUMMARY OF THE INVENTION

An object of the present invention is to provide a parking brake system which can be operated with light operational force.

To achieve the object, a first engaging member (a catch) is integrally provided on the brake pedal below a floor of the vehicle. A parking brake operating member (a parking brake lever) is disposed above the floor. The parking brake operating member is shifted so as to be retained at either a releasing position or a parking position. A second engaging member (a ratchet) for engaging with the first engaging member is pivoted on a part of the vehicle below the floor so as to be shifted between a locking position and an unlocking position according to operation of the parking brake operating member. An overcenter spring is interposed between the second engaging member and the chassis of the vehicle so as to alternately bias the second engaging member toward the locking position and the unlocking position. In such a construction, the second engaging member is retained at the locking position when the parking brake operating member is located at the parking position, and if the brake pedal is pressed at this time, engages with the first engaging member.

The parking brake system of the present invention uses a rotatable second engaging member which can be alternately biased in opposite directions by the overcenter spring. While the parking brake operating member is shifted to apply the parking brake, the second engaging member initially is biased so as to resist against the operating force on the operating member. However, when the parking brake operating member is shifted beyond a certain position, the second engaging member comes to be oppositely biased by the overcenter action of the spring so as to coincide with the operational force in direction. Then, the parking brake operating member is automatically shifted to the parking position.

Furthermore, the present invention further comprises a co-axially disposed first rod and second rod and a second spring interposed between the first and second rods so as to bias the rods toward each other, wherein the first rod interlocks with the second engaging member, and the second rod interlocks with the parking brake operating member. When the parking brake operating member is shifted from the parking position to the releasing position, if the brake pedal is not pressed, the second spring is stretched so as to allow the second rod to follow the parking brake operating member, however, the first rod and the second engaging member engaging with the first engaging member still remain, and if the brake pedal is pressed, the first engaging member is lowered so as to disengage from the second engaging member, and the second engaging member is automatically rotated to the unlocking position by biasing of the second spring through the first rod.

Accordingly, both further pressing of the brake pedal and shifting of the operating member are required to release the parking brake, thereby preventing the brake pedal from being unintentionally unlocked.

Another object of the present invention is to enable an operator sitting on a seat of the vehicle to easily decide whether the parking brake is applied or not.

To achieve the object, a grip of the parking brake operating member is provided thereon with a first caution-marked surface for indicating such a state that parking brake is released and a second caution-marked surface for indicating such a state that parking brake is applied.

The grip is disposed in relation to the seat so that, when it is located at the releasing position, only the first caution-marked surface of both caution-marked surfaces comes into view of an operator sitting on a seat of the vehicle, and when it is located at the parking position, only the second caution-marked surface comes into view of the operator.

Furthermore, the grip is vertically rotatable and the first caution-marked surface and the second caution-marked surface are extended along tangents of circles centering a fulcrum of rotation of the parking brake operating member.

The above and other related objects, features and advantages of the present invention will be apparent from the reading of the following description of the disclosure of the accompanying drawings and the novelty thereof pointed out in the appended claims.

DETAILED DESCRIPTION OF THE PREFERRED EMBODIMENTS

Figure 1:
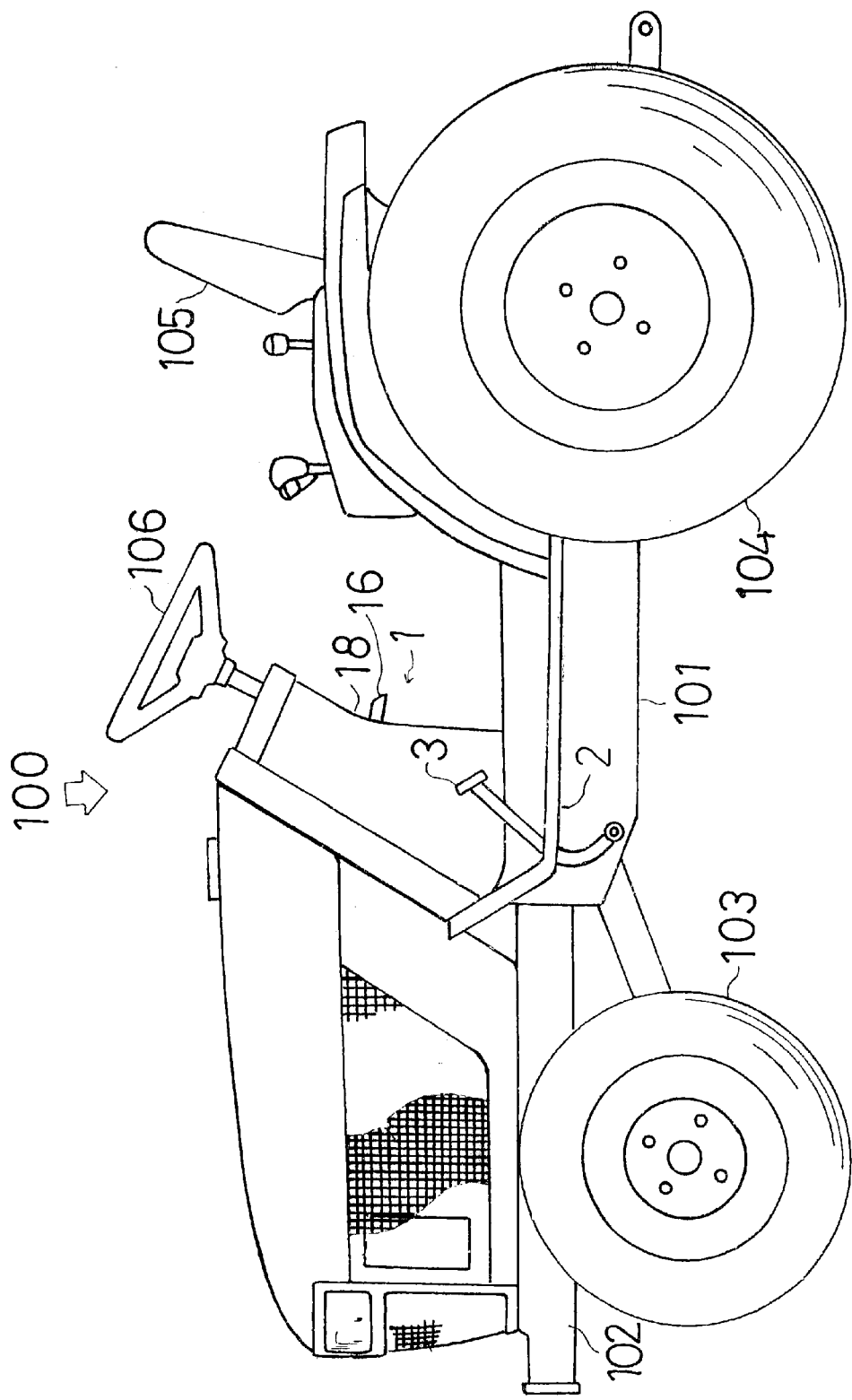
FIG. 1 is a side view of an entire tractor equipped with a parking brake system according to the present invention.

At first, a general description will be given on a tractor 100 as a preferred embodiment of a vehicle which employs a parking brake system of the present invention in accordance with FIG. 1.

A main frame 101 is provided as a housing for a clutch system, a transmission and the like, and a pair of parallel engine frames 102 extend forwardly from main frame 101, thereby constituting a chassis. Left and right front wheels 103 are disposed below respective engine frames 102, and left and right rear wheels 104 are disposed on both lateral sides of the transmission in a rear portion of main frame 101.

Left and right footboards (floors) 2 are disposed substantially horizontally over main frame 101. A seat 105 is disposed on the rear portion of main frame 101. A steering column 18 is provided in front of seat 105 and a steering wheel 106 is disposed on the top of steering column 18.

Figure 3:
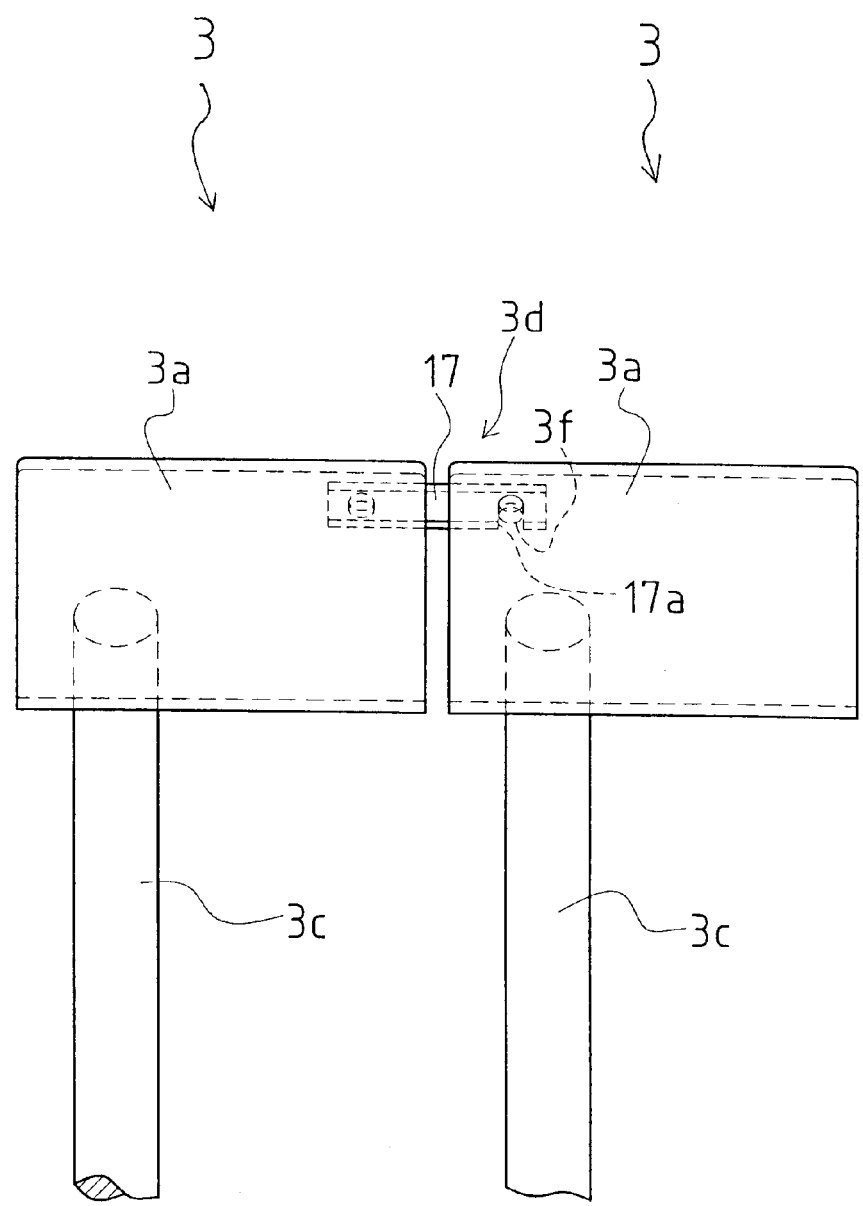
FIG. 3 is a rear view of the brake pedals joined together.

As shown in FIG. 3, a pair of brake pedals 3 are laterally juxtaposed through right footboard 2 beside steering column 18. A parking brake system 1 of the present invention is equipped in association with brake pedals 3.

Each brake pedal 3 consists of a pedal top 3a, a base bushing 3b (FIG. 2) and a stem 3c. Pedal top 3a is disposed just above right footboard 2. Stem 3c integrally extends downwardly from pedal top 3a and bends rearwardly below right footboard 2. Base bushing 3b is integrally formed on the rear end of stem 3c. A pivotal shaft 4 is fixedly disposed laterally below right footboard 2, so as to rotatably support base bushings 3b of both brake pedals 3 there around, so that juxtaposed brake pedals 3 are co-axially and vertically rotatable.

Both brake pedals 3 can be joined together through a pedal connection unit 3d which is interposed between their pedal tops 3a. Pedal connection unit 3d consists of a connecting plate 17 and a projection 3f. Connecting plate 17 forms a recessed portion 17a at its utmost end and is rotatably supported at the vicinity of the other end thereof onto the lower surface of one pedal top 3a. Projection 3f projects downwardly from the lower surface of the other pedal top 3a. To connect, plate 17 is rotated so as to retain projection 3f into its recessed portion 17a, joining together both pedals 3.

A spring 5 is interposed between an intermediate portion of stem 3c of each brake pedal 3 and the vehicle body so as to bias brake pedal 3 upwardly.

A tab 3e projects from base bushing 3b of each brake pedal 3. A pair of cam levers 6, which individually act on both brakes for left and right rear wheels 104, are provided on left and right sides of a rear portion of the vehicle body. A brake rod 7 is interposed between each tab 3e and each cam lever 6.

When one of pedal tops 3a is pressed against the biasing of spring 5, corresponding tab 3e is rotated so as to rotate corresponding cam lever 6 through brake rod 7, thereby braking rear wheel 104 on the corresponding side.

While both pedal tops 3a are joined through connection unit 3d, even if either of pedal tops 3a is pressed, both brake pedals 3a are lowered together, so that both cam levers 6 are rotated so as to brake both rear wheels 104 simultaneously.

A bracket 8 projects downwardly from the lower surface of footboard 2 as a part of the chassis. A ratchet 9 serving as a second engaging member is pivoted onto bracket 8 so as to be vertically rotatable around a fulcrum 0. Ratchet 9 is provided at its lower front edge with teeth 9a. A catch 10 serving as a first engaging member projects upwardly rearward from an intermediate portion of stem 3c of either brake pedal 3.

Figure 4:
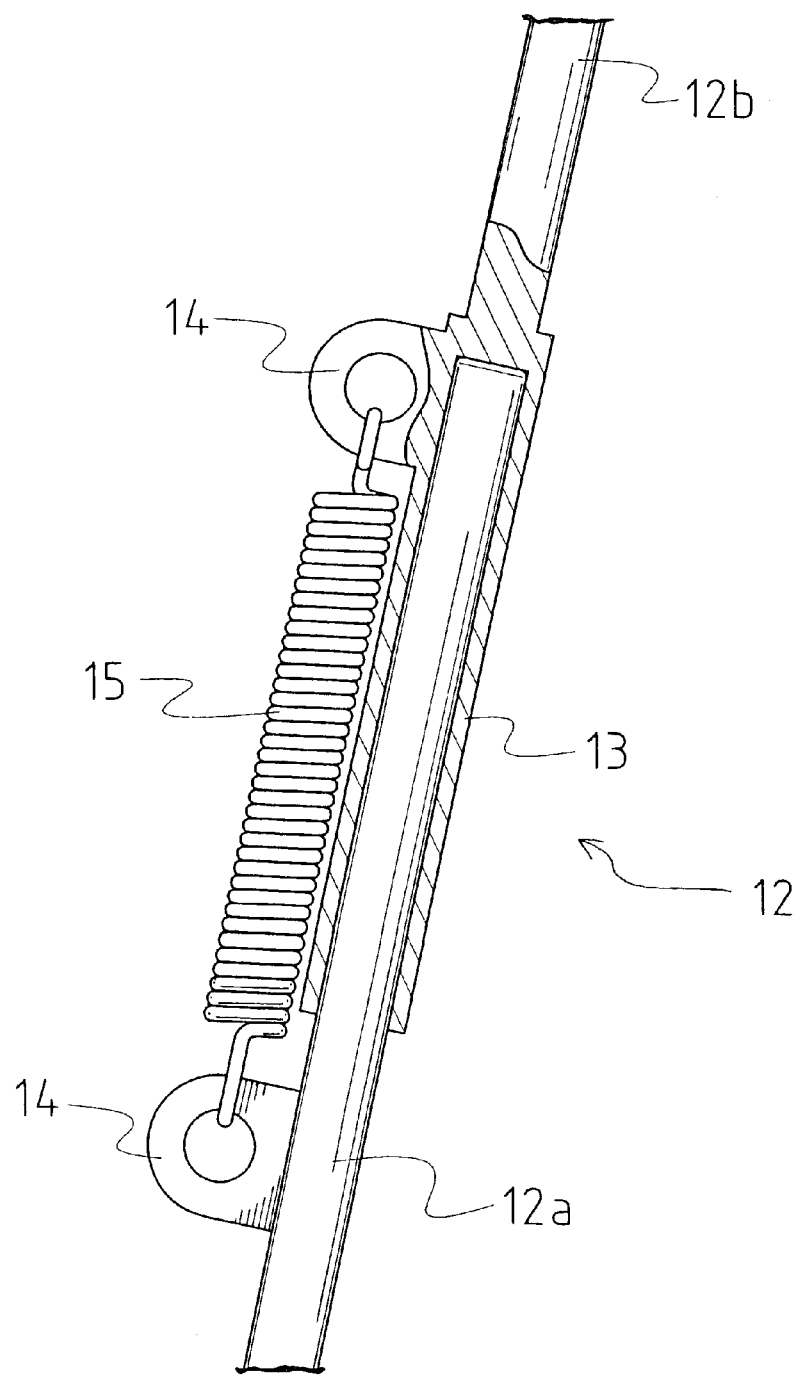
FIG. 4 is a sectional side view of a linkage for a parking brake lever of the parking brake system.

A link 12 projects upwardly from ratchet 9 along steering column 18. In this regard, link 12 comprises a lower first rod 12a and an upper second rod 12b disposed coaxially with each other. Second rod 12b forms a downwardly opening cylinder 13 at its lower portion, and an upper portion of first rod 12a is slidably inserted into cylinder 13, as shown in FIG. 4. A lower end of first rod 12a is pivoted onto a rear pivotal point R at a rear portion of ratchet 9. Tabs 14 are provided on first and second rods 12a and 12b, respectively. A spring 15 is stretchably interposed between both tabs 14, so as to make the top of first rod 12a abut against the inner top of cylinder 13.

Steering column 18 is provided at the rear portion thereof, downwardly slantwise from seat 105, with a recessed portion 18a which is open toward seat 105. A parking brake lever 16 serving as a parking brake operating member is pivoted in recessed portion 18a so as to be vertically rotatable. The top end of second rod 12b inserted into steering column 18 is pivoted onto a front edge of lever 16. Thus, ratchet 9 is interlocked with parking brake lever 16 through link 12.

Figure 2:
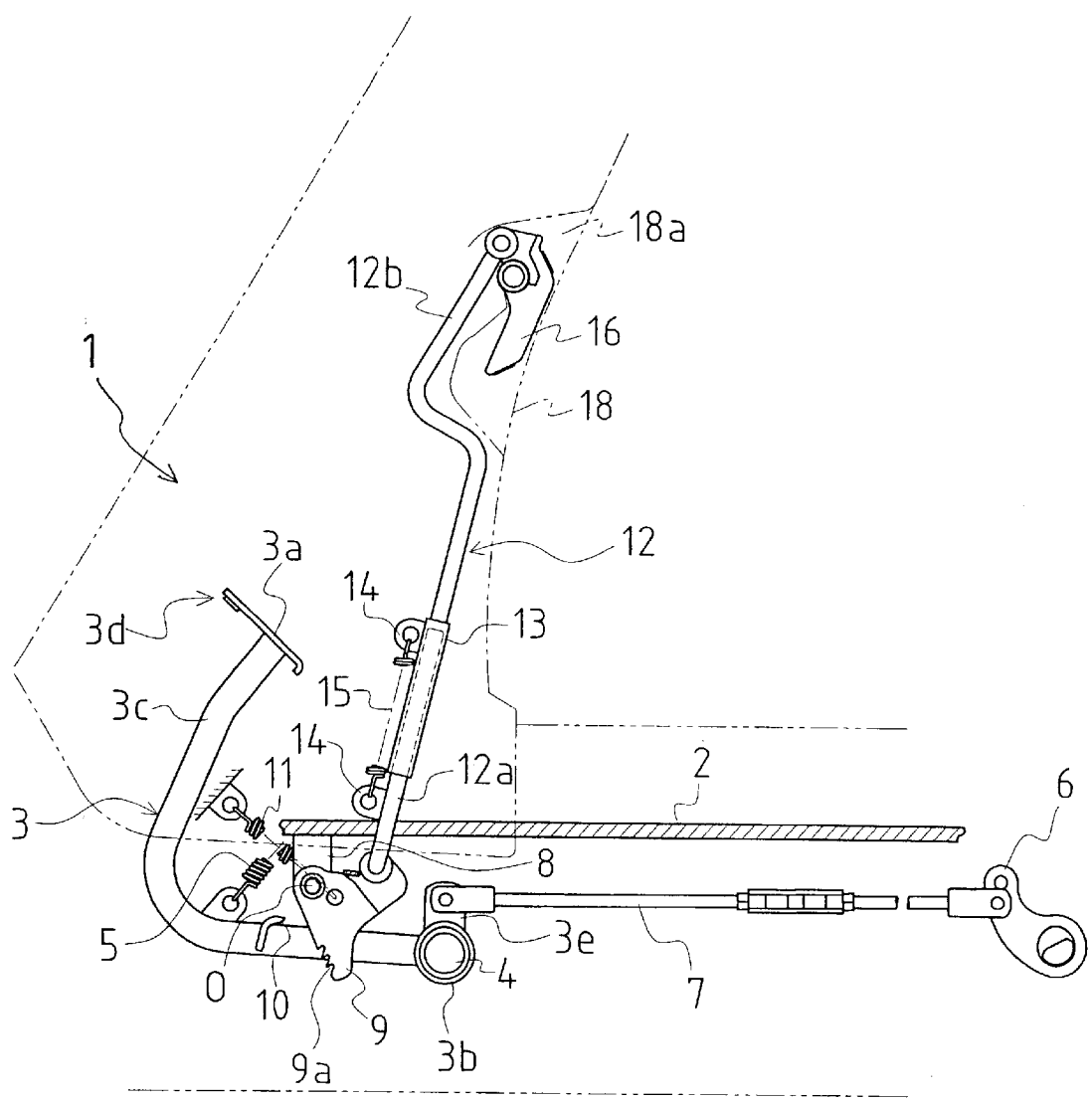
FIG. 2 is a sectional side view of the parking brake system according to the present invention, wherein brake pedals are not pressed and unlocked.
Figure 5:
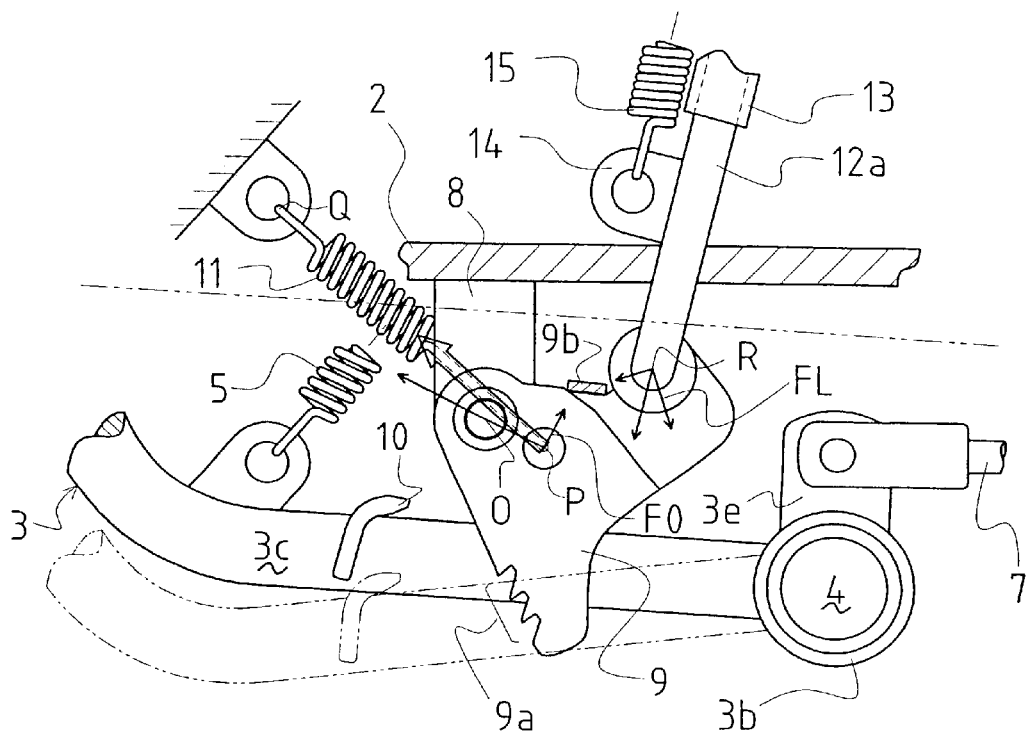
FIG. 5 is a fragmentary sectional side view of the parking brake system shown in FIG. 2.

An overcenter spring 11 is interposed between a point P of ratchet 9 and a point Q of the chassis of the vehicle, so as to alternately bias ratchet 9 toward the locking position and the unlocking position. FIGS. 2 and 5 illustrate the parking brake as not applied, in other words, brake pedals 3 are unlocked. In this state, a straight line passing points Q and P is disposed behind a straight line passing points Q and O. Ratchet 9 is stressed at its point P as a hollow arrow illustrated in FIG. 5 by tension of spring 11. It should be noticed that the tension is analyzed into a component force toward fulcrum O and a component force FO in perpendicular thereto. Force FO acts as an unlocking moment of ratchet 9 (counterclockwise in FIG. 5). Hence, spring 11 biases ratchet 9 toward its unlocking position where an upper edge of ratchet 9 finally abuts against a stopper 9b fixed onto the vehicle body.

A description will now be given on an operation process of the parking brake system.

Referring to application of the parking brake, either or both of pedal tops 3a joined with each other through connection unit 3d are pressed so that catch 10 is lowered together with both brake pedals 3 to a phantom position drawn in FIG. 5.

Figure 13:
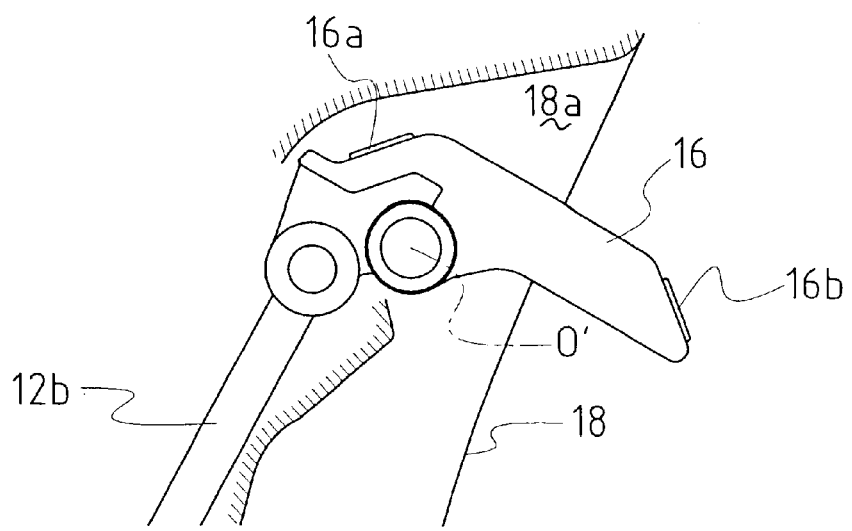
FIG. 13 is a fragmentary sectional side view of the same which is located at the parking position.

Then, a grip end of parking brake lever 16 is pulled up to its parking position as shown in FIG. 13, so as to push second rod 12b together with first rod 12a downwardly.

Figure 7:
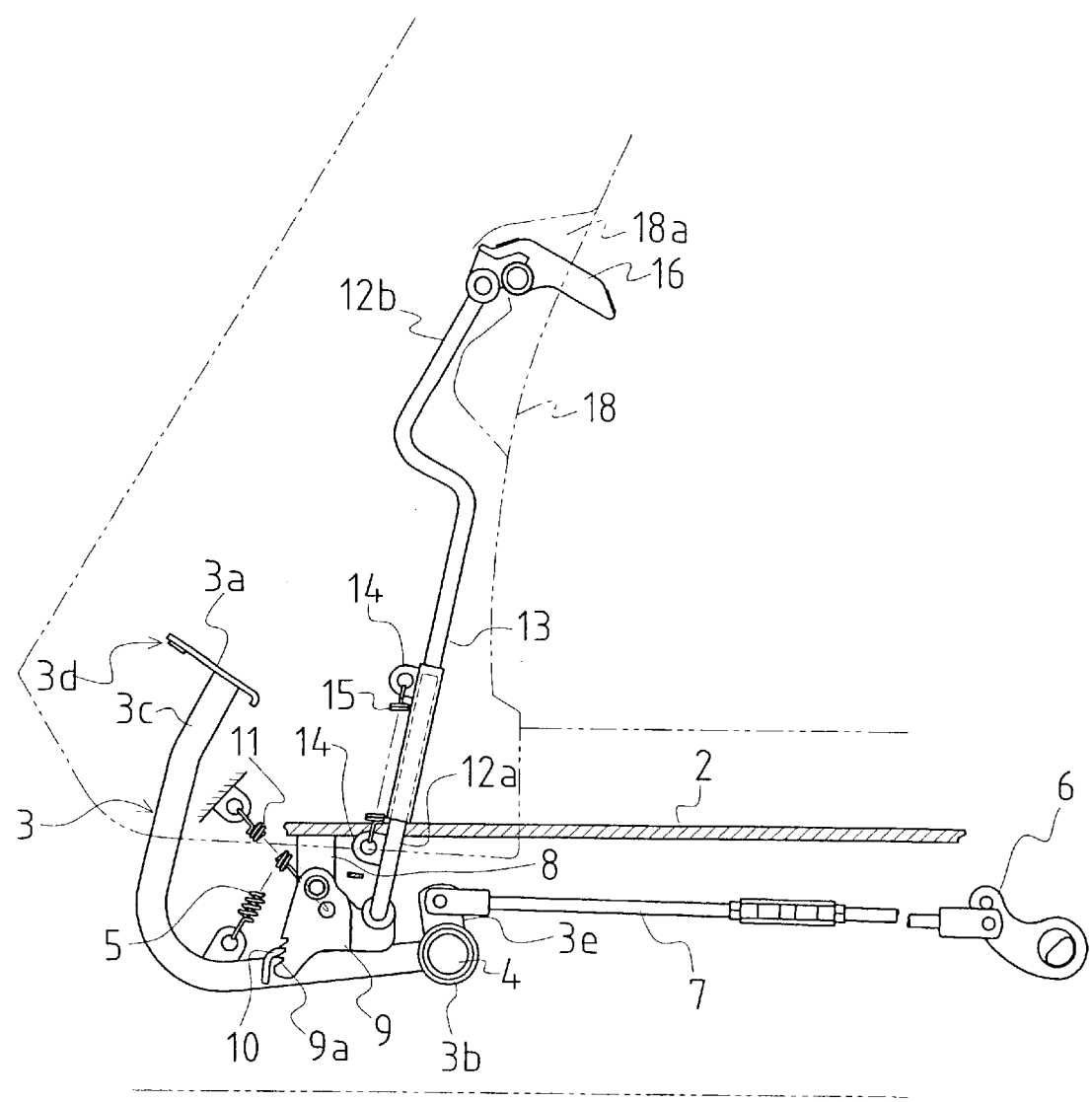
FIG. 7 is a sectional side view of the parking brake system, wherein the lowered brake pedals are locked.
Figure 8:
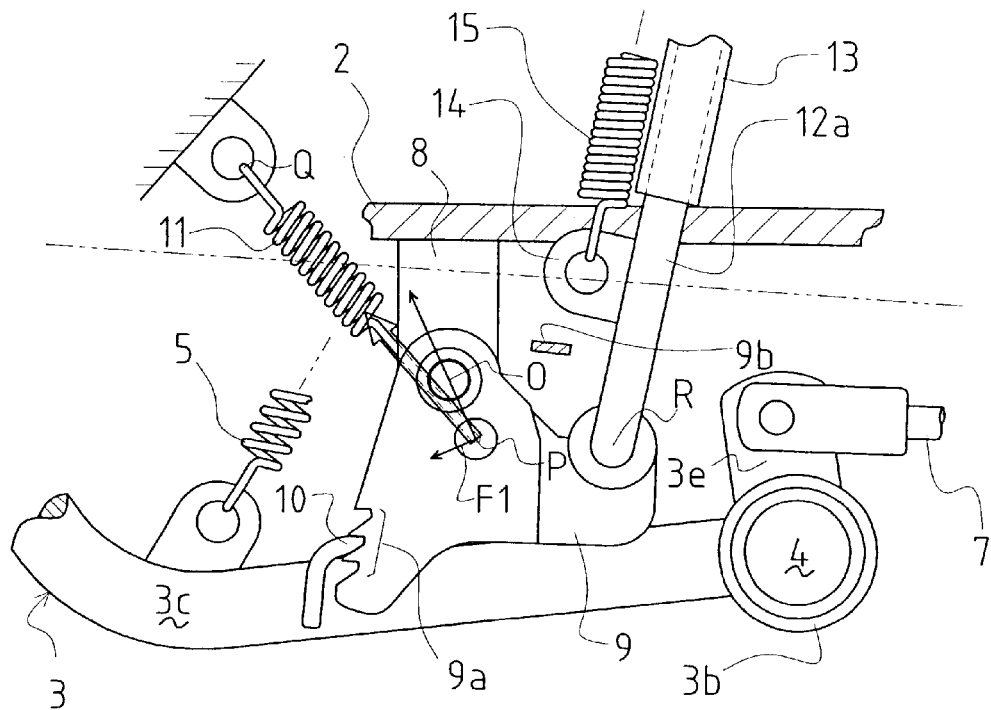
FIG. 8 is a fragmentary sectional side view of the parking brake system shown in FIG. 7.

Resulting first rod 12a applies a downward force as a downward arrow drawn in FIG. 5 onto point R of ratchet 9. It should be noticed that the downward force is analyzed into a component force toward fulcrum O and a component force FL in perpendicular thereto. Force FL acts as a locking moment of ratchet 9 (clockwise in FIG. 5). Accordingly, catch 10 engages with one of teeth 9a of ratchet 9 as shown in FIGS. 7 and 8.

Thus, both brake pedals 3 are retained by ratchet 9 against biasing of springs 5. Additionally, spring 11 which has rotated beyond fulcrum O (when the straight line through points Q and P has rotated forwardly across the straight line through points Q and O) biases ratchet 9 toward its locking position to engage with catch 10. As a result, both brake pedals 3 are held as they have been pressed, so as to keep both rear wheels 104 braked, whereby the parking brake is applied.

The action of overcenter spring 11 during the above mentioned locking process will be described. When the parking brake is not applied, the straight line through points Q and P is disposed behind that through points Q and O, so that spring 11 acts as unlocking directed force FO. Accordingly, link 12 is raised and the grip of lever 16 is biased to enter recessed portion 18a. An operator is prevented from being hitched on the grip of lever 16 at its releasing position shown in FIG. 12, where lever 16 is entirely held in recessed portion 18a. Even if a somewhat lifting force is applied on the grip of lever 16, lever 16 and ratchet 9 remain by resistant force PO.

Figure 6:
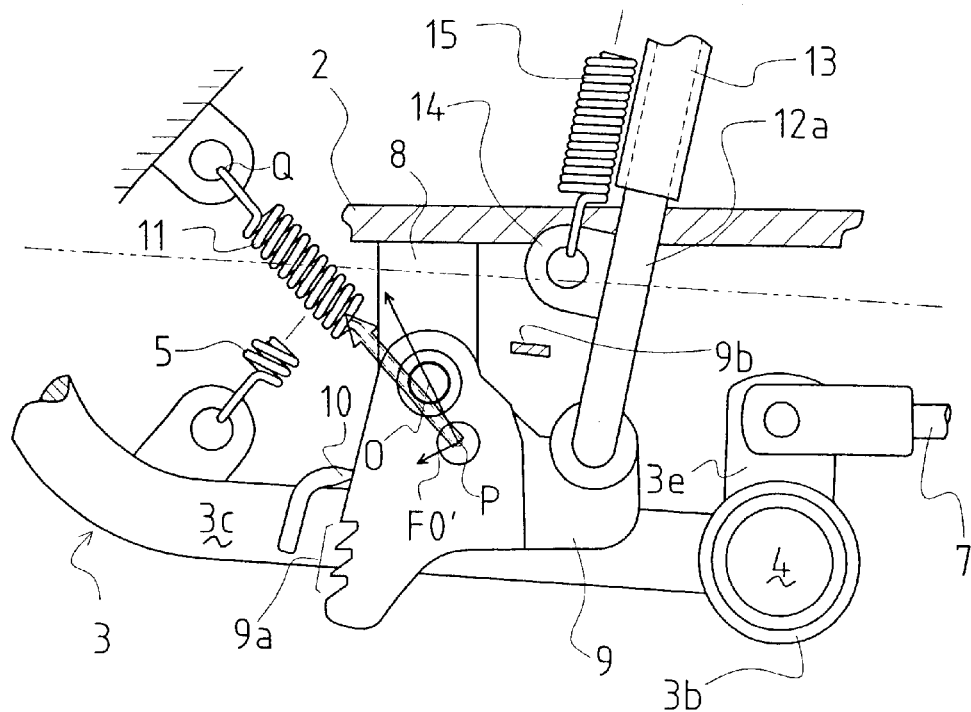
FIG. 6 is a fragmentary sectional side view of the same, when the parking brake lever is located at a parking position while the pedals are not pressed.

Then, if the grip of lever 16 is pulled up to its parking position, ratchet 9 rotates toward its locking position, so that point P on which the tension of spring 11 acts is revolved forwardly around fulcrum O. At last, the line through points Q and P comes in front of that through points Q and O, as shown in FIG. 6, so that the tension of spring 11 includes locking directed component force FO'.

Summarily, spring 11 resists against the raising force applied on the grip of lever 16 until the grip rotated from the releasing position reaches a certain position, however, after the grip of lever 16 is rotated beyond the certain position, ratchet 9 is oppositely rotated toward its locking position by the biasing of spring 11 without raising force applied on the grip of lever 16. Hence, the grip of lever 16 raised beyond the certain position is kept at its parking position as shown in FIG. 13.

While the grip of lever 16 is not raised (in other words, it is located at the releasing position), even if brake pedals 3 are pressed so as to be lowered to the phantom position drawn in FIG. 5, ratchet 9 does not rotate so that catch 10 is apart from teeth 9a of ratchet 9, whereby the parking brake is not applied or brake pedals 3 are unlocked.

Afterward, brake pedals 3, when they are released from an operator's foot, return upwardly to the original position (drawn in full lines as shown in FIG. 5) by spring 5.

If the grip of lever 16 is raised while brake pedals 3 are not lowered, ratchet 9 rotates to its locking position, however, catch 10, which has not been lowered, abuts against the front edge of ratchet 9 above teeth 9a as shown in FIG. 6, whereby the parking brake is not applied. However, when brake pedals 3 are pressed, catch 10 is lowered so as to engage with one of teeth 9a of ratchet 9, which is biased by spring 11 with force FO', as shown in FIGS. 7 or 8, whereby the parking brake is applied or lowered brake pedals 3 are locked.

As a result, both pressing of brake pedals 3 and raising of the grip of lever 16 are required to apply the parking brake (or to lock brake pedals 3 at their braking positions). In other words, when one of the two operations is missing, the parking brake is not applied (or brake pedals 3 are unlocked).

Figure 10:
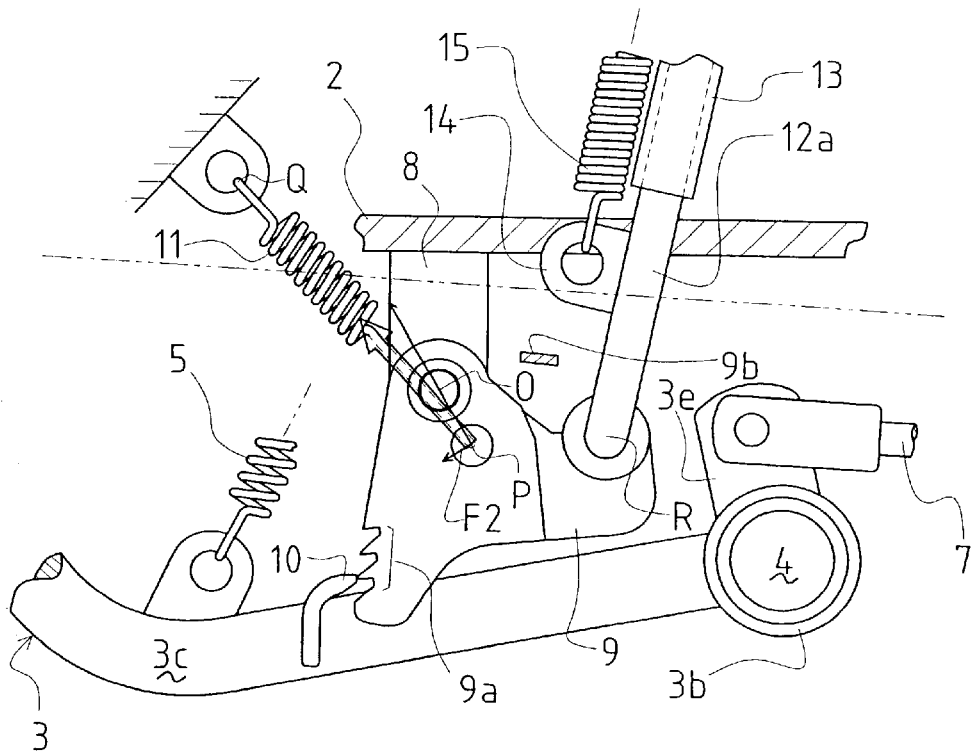
FIG. 10 is a fragmentary sectional side view of the same when the parking brake lever is located at the parking position and the lowered pedals are pressed so as to be further lowered.

FIGS. 7 and 8 illustrate that lowered brake pedals 3 are locked so as to apply the parking brake. The tension applied onto ratchet 9 by spring 11 involves component force F1 which biases ratchet 9 toward its locking position. If lowered brake pedals 3 which are joined together are pressed, catch 10 is further lowered against tooth 9a which has engaged with catch 10, as shown in FIG. 10. Then, an operator raises his or her foot apart from brake pedals 3, so that catch 10 is biased upwardly so as to engage with lower tooth 9a of ratchet 9 which is biased downwardly forward by a component force F2 of tension of spring 11, thereby increasing the force of parking brake.

Figure 11:
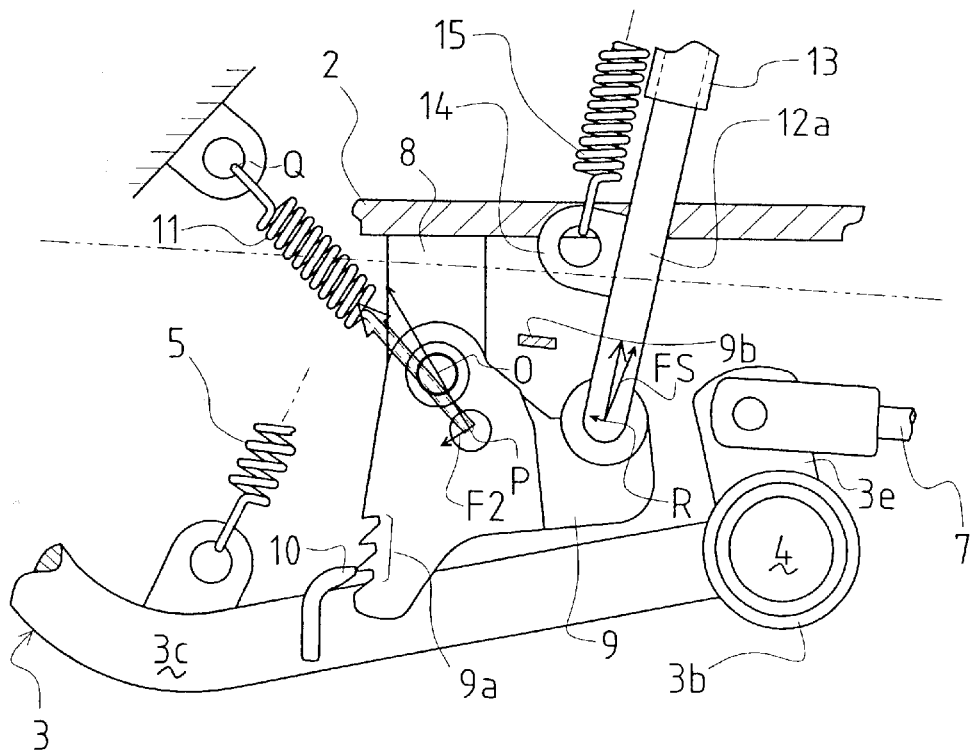
FIG. 11 is a fragmentary sectional side view of the same when the parking brake lever is located at the releasing position and the lowered pedals are pressed so as to be further lowered.

To release the parking brake, lowered brake pedals 3 are pressed so as to be further lowered, as shown in FIG. 10, so that catch 10 applies no upward force against tooth 9a. Then, an operator pushes down the raised grip end of lever 16 to the releasing position, so that the front end of lever 16 rises so as to raise second rod 12b and stretch spring 15 which applies a tension onto first rod 12a, as shown in FIG. 11. It should be noticed that the tension is analyzed into a component force toward fulcrum O and a rearwardly upward component force FS perpendicular thereto, as shown in FIG. 11. Force FS acts as a moment of ratchet 9 toward its unlocking position (so as to rotate it counterclockwise in FIG. 11). Catch 10 which has no upward resistance allows tooth 9a to rotate downwardly, so that first rod 12a is pulled up by spring 15 and ratchet 9 rotates toward its unlocking position by biasing force FS, thereby being removed from catch 10.

Figure 12:
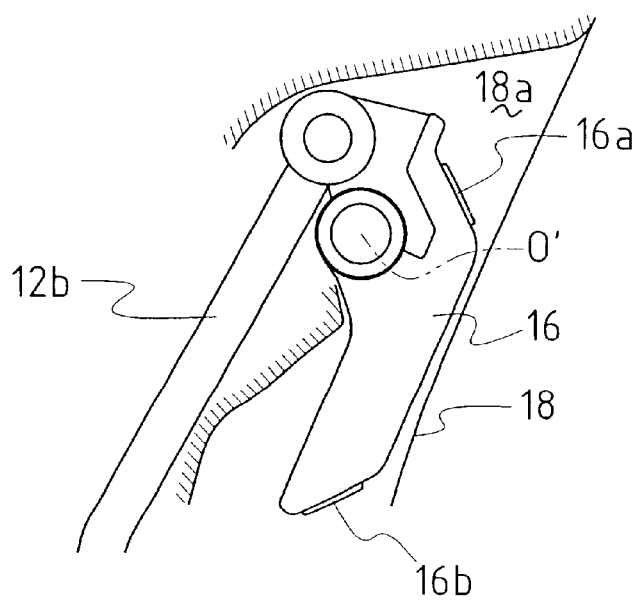
FIG. 12 is a fragmentary sectional side view of the parking brake lever which is located at the releasing position.

While ratchet 9 is rotated toward the unlocking position, at first, the tension of spring 11 involving component force F2 which biases ratchet 9 toward the locking position resists against component force FS of tension of spring 15. However, once the straight line through points Q and P comes rearwardly beyond that through points Q and O, component force F2 of the tension turns oppositely so as to bias ratchet 9 toward the unlocking position. Thus, forces F2 coincides with force FS in direction. Then, parking brake lever 16 is automatically lowered to the releasing position as shown in FIG. 12. Hence, brake pedals 3 are unlocked, so that they can return to the original position as shown in FIGS. 2 and 5 unless they are pressed.

Figure 9:
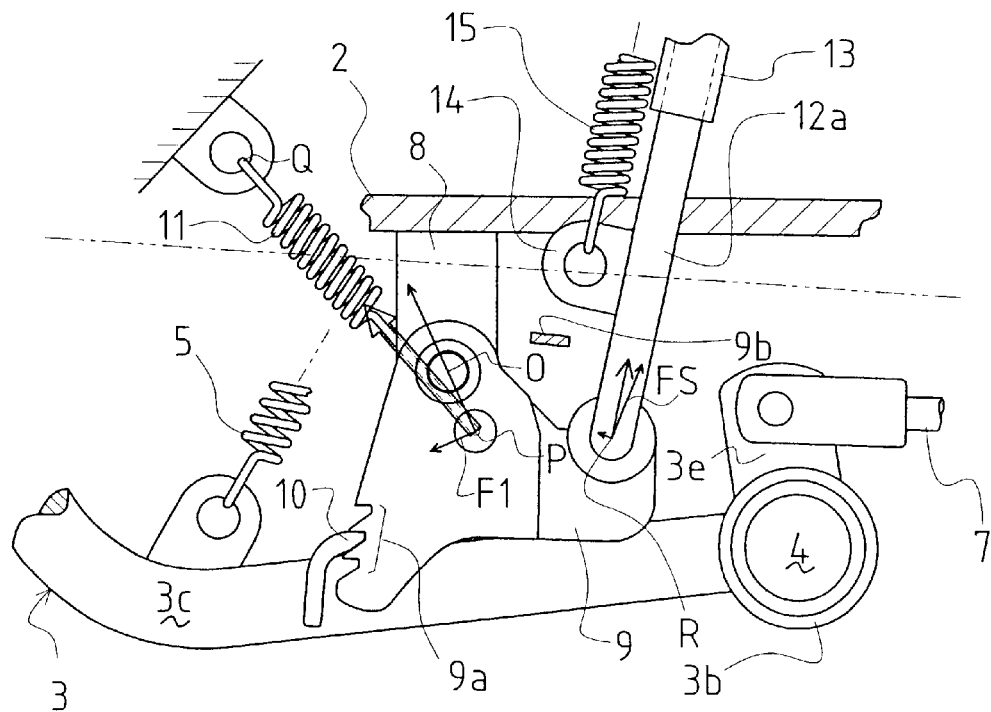
FIG. 9 is a fragmentary sectional side view of the same when the parking brake lever is located at a releasing position while the lowered pedals are not pressed.

If lever 16 is pushed down while lowered brake pedals 3 are not pressed, catch 10 still engages with tooth 9a so as to prevent ratchet 9 from its rotation, as shown in FIG. 9, so that ratchet 9 cannot be separated from brake pedals 3, whereby the parking brake is still applied. Second rod 12b is lifted and spring 15 is stretched so as to apply the tension involving component force FS onto ratchet 9, however, first rod 12a remains. Thus, when the pressed grip of lever 16 is released from the operating force, lever 16 returns upwardly to the parking position shown in FIGS. 7 or 12 by biasing of springs 11 and 15.

As a result, both further pressing of brake pedals 3 and lowering of the grip of lever 16 are required to release the parking brake (or to unlock brake pedals 3). In other words, when one of the two operations is missing, the parking brake is still applied (or brake pedals 3 are still locked at their braking positions).

Parking brake lever 16 is so constructed as to enable an operator to easily determine whether the parking brake is applied or not. As shown in FIG. 12, unless the parking brake is applied, lever 16 is entirely housed in recessed portion 18a of steering column 18. A slant cut-off surface provided on a base portion of the grip of lever 16 looks like a substantial tangent line of a circle centering fulcrum O' for rotation of lever 16 when viewed from the side. Recessed portion 18a whose ceiling slants upwardly rearward comes into view of an operator sitting on seat 105. A caution mark 16a, on which a word such as "UNLOCKED" or "NOT-PARKING" is drawn, is attached to the slant cut-off surface of lever 16 to indicate that the parking brake is not applied.

As shown in FIG. 12, lever 16 is also provided at its grip end thereof with another slant cut-off surface substantially extending along a tangent of a circle centering fulcrum O' when viewed from the side. A caution mark 16b, on which a word such as "LOCKED" or "PARKING" is drawn for indicating that the parking brake is applied, is attached onto the slant cut-off surface of the grip end of lever 16. As shown in FIG. 13, an operator sitting on seat 105 can see the word on caution mark 16b when the rear end of lever 16 is raised so as to project rearwardly from steering column 18. Instead of caution marks 16a and 16b, the words may be directly printed or carved on the surfaces of lever 16.

In summary, when lever 16 is located at the releasing position as shown in FIG. 12, caution mark 16a for indication of unlocked brake pedals 3 faces upwardly rearward, while caution mark 16b for indication of locked brake pedal 3 faces downwardly rearward. Accordingly, the operator sitting on seat 105 cannot see caution mark 16b but can see caution mark 16a, whereby the operator can recognize the state of the parking brake as not applied.

On the contrary, when lever 16 is rotated around fulcrum O' to the position shown in FIG. 13 where the grip end of lever 16 is raised rearwardly so as to apply the parking brake, caution mark 16a reaches the inner side of recess 18a and caution mark 16b faces upwardly rearward. Accordingly, the operator cannot see caution mark 16a but can see caution mark 16b, whereby the operator can recognize the state the parking brake as applied.

What is claimed is:

1. A parking brake system, comprising:
   a brake pedal penetrating a floor of a vehicle;
   a first engaging member integrally provided on said brake pedal;
   a parking brake operating member disposed above the floor, wherein said parking brake operating member is shifted so as to be retained at either a releasing position or a parking position;
   a second engaging member, for engaging with said first engaging member, pivoted on a chassis of the vehicle below the floor so as to be rotated between a locking position and an unlocking position in accordance with operation of said parking brake operating member; and
   an overcenter spring biased between and directly connected to said second engaging member and to the chassis so as to alternately bias said second engaging member toward either the locking position or the unlocking position,
   wherein said second engaging member is retained at said locking position when said parking brake operating member is located at said parking position, and engages with said first engaging member, if said brake pedal is lowered at this time.

2. The parking brake system as set forth in claim 1, further comprising:
   a first rod interlocking with said second engaging member;
   a second rod interlocking with said parking brake operating member, wherein said second rod is disposed co-axially with said first rod; and
   a second spring interposed between said first rod and said second rod so as to bias both said first and second rods toward each other,
   such that when said parking brake operating member is at said parking position, and shifted to said releasing position without applying a force to said brake pedal, said first engaging member and said second engaging member remain engaged, and said second spring is placed in tension as said second rod follows said parking brake member while said first rod and said second engaging member remain stationary, and
   such that when said lowered brake pedal is pressed further, said second engaging member is biased by said second spring through said first rod to disengage from said first engaging member.

3. The parking brake system as set forth in claim 2, wherein an end of said first rod forms a cylinder, and an end of said second rod extends into said cylinder of said first rod.

4. The parking brake system as set forth in claim 1, further comprising:
   a first caution-marked surface, for indicating that said parking brake operating member is in said releasing position, provided on a grip of said parking brake operating member, and
   a second caution-marked surface, for indicating that the parking brake is applied, provided on said grip of said parking brake operating member, wherein said grip of said parking operating member is disposed in relation to an operator's seat so that, when said parking brake operating member is located at said releasing position, only said first caution-marked surface of both said caution-marked surfaces comes in a view of an operator sitting on the seat, and when said parking brake operating member is located at said parking position, only said second caution-marked surface comes in the view of the operator.

5. The parking brake system as set forth in claim 4, wherein said grip of said parking brake operating member is vertically rotatable and said first caution-marked surface and said second caution-marked surface are extended along tangents of circles centering a fulcrum of rotation of said parking brake operating member.

6. A parking brake system, comprising:
   a brake pedal vertically penetrating a floor of a vehicle;
   a first engaging member integrally provided on said brake pedal below the floor;
   a parking brake operating member disposed above the floor, wherein said parking brake operating member is shifted so as to be retained at either a releasing position or a parking position;

a second engaging member, for engaging with said first engaging member, pivoted on a chassis of the vehicle below the floor so as to be rotated between a locking position and an unlocking position in accordance with operation of said parking brake operating member;

a first spring interposed between said second engaging member and the chassis so as to alternately bias said second engaging member toward either the locking position or the unlocking position; and an interlocking member operatively connecting said parking brake operating member with said second engaging member, said interlocking member including a first rod and a second rod, said first and second rods being biased toward each other by a second spring, wherein an axis of said second spring is not coincident with an axis of said first and second rods, wherein by shifting said parking brake operating member from said releasing position to said parking position, said second engaging member is rotated to said locking position without stretching or compressing said second spring, wherein while said parking brake operating member is located at said parking position, said second engaging member is retained at said locking position and is engaged with said first engaging member by lowering said brake pedal, and wherein by shifting said parking brake operating member from said parking position to said releasing position while said second engaging member engages with said first engaging member, said second spring is stretched or compressed so as to keep said second engaging member at its position.

7. The parking brake system as set forth in claim 6, wherein said first rod interlocks with said second engaging member; and wherein said second rod interlocks with said parking brake operating member, and wherein said second rod is disposed co-axially with said first rod;

wherein said second spring is interposed between said first rod and said second rod, such that when said parking brake operating member is at said parking position, and shifted to said releasing position without applying a force to said brake pedal, said first engaging member and said second engaging member remain engaged, and said second spring is placed in tension as said second rod follows said parking brake member while said first rod and said second engaging member remain stationary, and such that when said brake pedal is pressed further, said second engaging member is biased by said second spring through said first rod to disengage from said first engaging member.

8. The parking brake system as set forth in claim 7, wherein said first rod and said second rod include tabs formed thereon, and wherein said second spring is interposed between said tabs.

9. The parking brake system as set forth in claim 6, further comprising:

a first caution-marked surface, for indicating that said parking brake operating member is in said releasing position, provided on a grip of said parking brake operating member, and a second caution-marked surface, for indicating that the parking brake is applied, provided on said grip of said parking brake operating member, wherein said grip of said parking operating member is disposed in relation to an operator's seat so that, when said parking brake operating member is located at said releasing position, only said first caution-marked surface of both said caution-marked surfaces comes in a view of an operator sitting on said seat, and when said parking brake operating member is located at said parking position, only said second caution-marked surface comes in the view of said operator.

10. The parking brake system as set forth in claim 9, wherein said grip of said parking brake operating member is vertically rotatable and said first caution-marked surface and said second caution-marked surface are extended along tangents of circles centering a fulcrum of rotation of said parking brake operating member.

11. The parking brake system as set forth in claim 6, wherein said link of said interlocking member includes a first rod and a second rod, wherein an end of said first rod forms a cylinder, and an end of said second rod extends into said cylinder of said first rod.

12. A parking brake system, comprising:

a parking brake operating member, wherein said parking brake operating member is shifted so as to be retained at either a releasing position or a parking position, said parking brake operating member including, a first marked surface provided on a grip of said parking brake operating member for indicating that said parking brake operating member is in said releasing position, and a second marked surface provided on said grip of said parking brake operating member for indicating that a parking brake is applied, such that when said parking brake operating member is at said releasing position, said first marked surface comes in a view of an operator, and when said parking brake operating member is at said parking position, said second marked surface comes in the view of the operator;

a brake pedal penetrating a floor of a vehicle;

a first engaging member integrally provided on said brake pedal below said floor;

a second engaging member, for engaging with said first engaging member, so as to be rotated between a locking position and an unlocking position in accordance with operating of said parking brake operating member; and an interlocking member operatively connecting said parking brake operating member with said second engaging member.

13. The parking brake system as set forth in claim 12, wherein said grip of said parking brake operating member is vertically rotatable and said first marked surface and said second marked surface are extended along tangents of circles centering a fulcrum of rotation of said parking brake operating member.

* * * * *

UNITED STATES PATENT AND TRADEMARK OFFICE
CERTIFICATE OF CORRECTION

PATENT NO.  : 6,341,539 B1
DATED       : January 29, 2002
INVENTOR(S) : Toshio Tsuda It is certified that error appears in the above-identified patent and that said Letters Patent is hereby corrected as shown below:

Title page,
Item [73], Assignee, delete "Kanaki" and insert -- Kanzaki -- therefor.

Column 10,
Line 50, delete "operating" and insert -- operation -- therefor.

Signed and Sealed this

Twenty-third Day of April, 2002

Attest:

JAMES E. ROGAN
Attesting Officer
Director of the United States Patent and Trademark Office